United States Patent
Legrand et al.

(10) Patent No.: US 7,193,008 B2
(45) Date of Patent: Mar. 20, 2007

(54) LIQUID CONCENTRATE OF MINERAL FILLERS CONTAINING GRAFTED POLYMERS AND THEIR USE FOR PREPARING PAINTS IN AQUEOUS AND/OR ORGANIC MEDIUM

(75) Inventors: Pierre Legrand, Puyricard (FR); Daniel Lefevre, Aubagne (FR)

(73) Assignee: Les Peintures Jefco Francis et Jean Durour, Marseilles (FR)

( * ) Notice: Subject to any disclaimer, the term of this patent is extended or adjusted under 35 U.S.C. 154(b) by 0 days.

(21) Appl. No.: 10/472,489

(22) PCT Filed: Mar. 29, 2002

(86) PCT No.: PCT/FR02/01112

§ 371 (c)(1),
(2), (4) Date: Sep. 30, 2003

(87) PCT Pub. No.: WO02/081581

PCT Pub. Date: Oct. 17, 2002

(65) Prior Publication Data

US 2004/0106715 A1 Jun. 3, 2004

(30) Foreign Application Priority Data

Apr. 5, 2001 (FR) .................. 01 04626

(51) Int. Cl.
C08J 3/00 (2006.01)
C08K 3/10 (2006.01)
C08K 3/30 (2006.01)
C08L 37/00 (2006.01)
C08L 39/00 (2006.01)

(52) U.S. Cl. ............... 524/555; 524/401; 524/423; 524/425; 524/436; 524/442; 524/445; 524/446; 524/447; 524/449; 524/451; 524/457; 524/492; 524/493; 524/548

(58) Field of Classification Search ........... 524/401, 524/423, 425, 436, 442, 445, 446, 447, 449, 524/451, 548, 457, 492, 493, 555
See application file for complete search history.

(56) References Cited

U.S. PATENT DOCUMENTS 5,231,131 A 7/1993 Chu et al.
6,362,274 B1 * 3/2002 Legrand et al. ............ 524/612

FOREIGN PATENT DOCUMENTS

| EP | 732346 | 9/1996 |
| EP | 826751 | 3/1998 |
| EP | 870809 | 10/1998 |
| WO | 97/28200 | 8/1997 |

* cited by examiner

*Primary Examiner*—Patrick Niland
(74) *Attorney, Agent, or Firm*—Dennison, Schultz & MacDonald

(57) ABSTRACT

A liquid concentrate of mineral fillers including an aqueous or organic solvent, mineral fillers useful for making paints, with a dry extract of mineral fillers not less than 65%, and a grafted copolymer of:

1) 5 to 40 wt. %, preferably 15 to 35 wt. %, more preferably 20 to 30 wt. % of anchoring sequences of a linear copolymer formed from at least two different monomer units including:
   a first ethylene monomer unit of at least a basic nitrogenous group, and
   a second unsaturated ethylene monomer unit of an aromatic group, preferably a phenyl, with the weight content of the first monomer units relative to th second monomer units is from 40 to 60 wt. %, preferably about 50 wt. %;

2) 25 to 90 wt. %, preferably 40 to 80 wt. %, more preferably 50 to 70 wt. % of organo-soluble hydrophobic sequences to disperse the particles in a polar medium; and 3) 5 to 70 wt. %, preferably 15 to 30 wt. %, more preferably 10 to 20 wt. % of hydrophilic sequences of a water-soluble polymer.

17 Claims, No Drawings

LIQUID CONCENTRATE OF MINERAL FILLERS CONTAINING GRAFTED POLYMERS AND THEIR USE FOR PREPARING PAINTS IN AQUEOUS AND/OR ORGANIC MEDIUM

This application is a filing under 35 USC 371 of PCT/FR02/01112 filed Mar. 29, 2002.

The invention concerns concentrates of mineral fillers containing grafted polymers comprising at least three sequences of different chemical nature, among which at least one anchoring sequence on solid particles consisting of mineral fillers, at least one sequence of hydrophobic nature and at least one sequence of hydrophilic nature.

By "sequence of hydrophilic nature" or "sequence of hydrophobic nature" is meant that said sequence is more hydrophilic or respectively more hydrophobic than the other two said sequences.

The invention also concerns a method for preparing paint using said liquid concentrates of mineral fillers.

In said liquid concentrates of mineral fillers, said copolymers are used as dispersing agent, solid particle stabilizer and/or emulsifier in an aqueous and/or organic medium, and are used for preparing paints in an aqueous and/or organic medium.

On completion of their manufacture, the mineral fillers used in the paints are in the form of aggregates or agglomerates. Their incorporation in a liquid, in order to obtain a stable suspension, therefore requires a prior dispersion step, during which these assemblies are dissociated into elementary particles under the effect of high mechanical stresses.

The action of these mechanical forces would not be efficient, however, if no dispersing agent is present.

Patent WO 97/28200 describes copolymers which are called "universal", i.e. can be mixed with or are compatible with other compositions of binders, solvents and additives or pigment compositions, for the preparation of paints which can indifferently be paints in an aqueous medium or a solvent medium.

These grafted copolymers are therefore used as dispersing agents and/or solid particle stabilizers and/or emulsifiers in an aqueous and/or organic medium, and/or as compatibiliser in an aqueous and/or organic medium.

As dispersing agent for solid particles in an aqueous and/or organic medium, the copolymers facilitate and complete mechanical dispersion via thorough particle wetting by the continuous phase, and through elimination of their surrounding air film.

These copolymers act at every dispersion step. Initially they ensure proper wetting of the particle by the continuous phase, replacing the air film surrounding the surface of the solid by liquid molecules. Subsequently, they substantially improve the yield of the dissolver/grinder during the breaking-up phase of agglomerates.

To be efficient, a copolymer which can be used as dispersant must therefore comprise an anchoring sequence, having good affinity with the surface of the particles, and one or more sequences compatible with the continuous phase in which these solids are incorporated. If one of these constituents is missing, or in the event of desorption of the dispersing agent, the system flocculates, a phenomenon which translates as re-agglomeration of the particles and an increase in viscosity of the dispersion. In the particular case of a paint, poor dispersion of the mineral fillers within the binder leads to rapid sedimentation of the filler agglomerates in the paint with an increase in its viscosity. Also, the paint's opacity and covering capacity is seen to drop, with reduced surface brilliance and reduced life-span of the paint film.

As stabilizing agent for the solid particles in an aqueous and/or organic medium, the copolymers are adsorbed on the surface of the solid and coat the particles forming a layer of solvated copolymers responsible for steric repelling forces and, in the case of polyelectrolytes in an aqueous medium, account for electrostatic repelling forces which counter Van der Waals attraction forces, thereby ensuring the stability of the dispersion. The anchoring sequence therefore needs to be highly adsorbed on the surface of the solid particle, for example through Van der Waals bonds, and one of the two other sequences respectively hydrophobic or hydrophilic, must be developed to set up steric repelling forces and/or electrostatic repelling forces depending upon the medium being used.

As emulsifier agent in an aqueous and/or organic medium, when the continuous phase of a dispersion of solid particles is not miscible with the receiving continuous paint phase, the copolymers facilitate and complete the mechanical emulsification of the continuous phase of the former in the latter. The emulsifying effect of the copolymer develops as soon as the copolymer has sufficiently long and numerous hydrophilic and hydrophobic sequences so that they can each be deployed within their respective affinity medium, water/organic solvent. The anchoring sequence plays a very small role in the emulsifying effect.

As compatibiliser agent for preparing the dispersion of solid particles in an aqueous and/or organic medium vis-à-vis other constituents of the paint. The compatibiliser effect of the copolymer is optimised if the conditions of stabiliser effect and emulsifier effect are met.

The plurality of chemical functions within one same copolymer, and the possibility of formulating dispersions of solid particles without elongation resin and/or without surfactant, improve the compatibility with resins, enabling the formulation of paints from a wide range of binders in aqueous and/or organic phase.

These copolymers contain a sequence enabling their anchoring onto solid particles, and at least 2 sequences of hydrophilic/water-soluble and hydrophobic/organo-soluble nature respectively, allowing their use in compositions in an aqueous and/or organic medium. The presence of an insoluble sequence in a selective medium, in surprising manner, increases the quantity of dispersant adsorbed on the surface of the particles, thereby avoiding the phenomenon of flocculation when the different pigments are mixed.

In WO97/28200 a grafted copolymer is made up of:

1/1 to 80 weight %, preferably 5 to 40 weight %, of one or more anchoring sequences on solid particles, consisting of a hydrocarbon chain, linear or branched, cycloalklyl or aromatic, containing basic nitrogenous groups of the type: heterocyclic, —$NH_2$, —NH—, —NHR, —$NR_2$, —$CONH_2$, —CONHR, —$CONR_2$ (where R is a (C1–C6) alkyl radical optionally substituted by one or more —OH, —COO—, —CO—, —O—, —$SO_3H$ groups), whose molecular weight lies between 150 and 10000, preferably between 300 and 3000, the weight content of basic nitrogenous monomers in the anchoring chain being at least 5%, preferably 30%, and 2/10 to 90 weight %, preferably 25 to 80 weight % of one or more sequences of hydrophobic nature, consisting of a hydrocarbon chain, linear or branched, cycloalkyl or aromatic, able to contain COO—, —S—, —F, —Si(OR')n(R")2-n-groups (in which R' and R" represent alkyl or aryl radicals, similar or different, with C1–C10, and n=0 to 2), formed of xmonomer units whose solubility parameter is 21.5 $J^{1/2}/cm^{3/2}$ or less, preferably less than 19 $J^{1/2}/cm^{3/2}$ and whose molecular weight lies between 250 and 10000, preferably between 500 and 3500, and 3/10 to 90 weight %, preferably 15 to 70 weight % of one or more sequences of hydrophilic nature, consisting of a hydrocarbon chain, linear or branched, comprising —O—, —OH, —NCO—, —COO—, —COOH, —CONH$_2$, —CONHR''' (in which R''' is a (C1–C3)alkyl radical), —NH—, —S—, —SO3H groups, formed of monomer units whose solubility parameter is greater than 22 $J^{1/2}/cm^{3/2}$, preferably greater than 22.5 $J^{1/2}/cm^{3/2}$, and whose molecular weight lies between 250 and 10000, preferably between 300 and 3000.

The anchoring sequences are preferably produced by radical copolymerisation of monomers comprising ethylene monomers carrying basic nitrogenous groups, these nitrogenous monomers being arranged statistically along the chain.

In WO 97/28200 as anchoring sequence it was proposed to copolymerize the above-cited nitrogenous monomers with one or more neutral unsaturated ethylene monomers. When it is sought to modify certain properties, such as glass transition temperature, stability or even mechanical properties. However, in the preferred examples of embodiment the anchoring sequences only contain ethylene monomers comprising nitrogenous groups to the exclusion of any other monomer.

In WO97/28200 the preferred grafted copolymers were specially developed to produce liquid concentrates of pigment dyes and comprise:

a main anchoring chain on solid particles comprising (meth) acrylate groups of dialkylaminoethyl, 2-vinylpyridine, 4-vinylpyridine, N,N-dimethyl-acrylamide, alone or in a mixture, one or more hydrophilic poly(ethylene oxide) grafts, and one or more hydrophobic grafts containing alkyl (meth) acrylates, vinyl esters, either alone or copolymerised with styrene and alkylstyrene derivatives, fluorinated monomers (trifluoroethyl methacrylate) or 3-(trimethoxysilyl) propyl methacrylate.

These liquid concentrates of pigment dyes contain a dry extract of dye pigments of less than 60% by weight.

With these copolymers it is not possible to obtain liquid concentrates of colourless mineral fillers of carbonate, silicate, sulfate and silica type used in paints, in particular those listed in table 2 of example 2, which are suitable for modular paint manufacture, i.e. with dry extracts of said colourless mineral fillers representing a weight content of 65% or more by weight of the liquid concentrate.

Said colourless mineral fillers in a paint are the main constituent together with the binder; they provide a thick microprorous, opaque structure and impart a specific matt, satin or gloss surface condition to the paint. And a paint must preferably contain at least 45 to 50% dry extract of these colourless mineral fillers.

The qualifying term "colourless" is used here and the generic expression "colourless mineral filler" to better distinguish between these thickening and opacifying mineral paint fillers of carbonate, silicate, sulfate and silica type compared with mineral dye pigments used to colour paints.

More particularly, a "colourless mineral filler" is defined as a mineral substance in powder, practically insoluble in aqueous or organic suspension media, having a refractive index of less than 1.7. As soon as it is added to an aqueous or organic medium, it becomes colourless through the phenomenon of refraction related to the difference in refractive index between the medium and the powder material. This refractive index is due to the crystallographic structure and chemical nature of the mineral compound concerned.

The purpose of the present invention is to provide a liquid concentrate of colourless mineral fillers, also called "mineral filler module" containing universal copolymers having the above-listed properties in a solvent or aqueous medium, and having a high dry extract content of fillers, in particular a weight content of filler dry extract of 65% or more, while being stable and compatible with other paint constituents, so that these paints may be prepared directly with these filler modules.

It is indeed advantageous to be able to prepare paints with liquid filler modules, which can therefore be stored in tanks, pumped, automatically proportioned and easily mixed so as to make paint production quick and economical. This reduces paint production times, and storage costs of raw materials in number and quantity, as well as paint manufacturing and formulation costs. This also has the added advantage of increasing paint diversity together with production flexibility and automation.

Insofar as the filler modules are the majority constituent of paints, and paints must have a weight content of dry extract of at least 45% with good application qualities, it is necessary to have mineral filler modules whose dry extract weight is the highest possible, in particular at least 65%.

These filler modules must be liquid so that they can be stored, pumped and proportioned using conventional equipment available in the paint industry. By "liquid" is meant here a fluid whose rheological characteristics measured at 20° C. are as follows:

flow threshold lower than 15 $N/m^2$, and viscosity at 500 $s^{-1}$, less than 40 Pa·s.

These filler modules must be stable so as to remain homogeneous during transport and storage: there must be no sedimentation or syneresis when maintained without temporary agitation. And no flocculation must occur of the solid particles in contact with the other paint constituents during incorporation into the paint formula.

The problem raised by the present invention is therefore to develop specific copolymers which fulfil these additional properties enabling the preparation of a mineral filler concentrate with a high dry extract content, liquid and stable, in combination with the preceding required properties of copolymers (dispersion, stabilisation, emulsification).

Another problem at the root of the present invention is the ability to provide copolymers that are effective for the different types of mineral fillers used in paints, in particular fillers formed of aluminium oxides and hydroxides, silica in particular such as quartz, silicate such as talc, kaolin and mica, barium sulfate or calcium carbonate such as chalk, calcite, dolomite and marble.

A further purpose of the present invention is to provide modules of said colourless mineral fillers with which it is possible to easily prepare paints by simply mixing liquid concentrates without the need for an external solid material.

It arises from the tests conducted by the inventors that it is difficult to obtain a copolymer which meets all the desired properties according to the objectives of the present invention.

In particular, it was found that an antagonism exists between the dispersing power and stabilising power of a copolymer. A copolymer having good dispersing functions has a propensity to give colourless mineral filler liquid concentrates which have a high dry extract content but are little stable and scarcely compatible. Conversely, a copolymer having high stabilisation properties has a tendency to give a liquid concentrate of colourless mineral fillers having a reduced dry extract content but with higher stability and compatibility.

Also, it is probable that the ion environment of mineral fillers interferes with chemical affinity and absorption between the anchoring sequence of the polymers and said solid particles. Therefore, mineral fillers of silica type have numerous hydroxyl groups on the surface, whereas fillers of carbonate type have carboxylic groups on the surface.

The various objectives of the present invention are achieved with a liquid concentrate of colourless mineral fillers which can be used for producing paints, containing an aqueous or organic solvent of said mineral fillers and a grafted copolymer containing at least three sequences of different chemical nature, among which at least one anchoring sequence able to be absorbed on solid particles consisting: of said mineral fillers, at least one sequence of hydrophobic nature and at least one sequence of hydrophilic nature, characterized in that its dry extract content of said mineral fillers is 65% by weight or higher of said liquid concentrate, and said copolymer is made of:

1/5 to 40 weight %, preferably 15 to 35 weight %, further preferably 20 to 30 weight % of said anchoring sequence(s) consisting of a linear copolymer formed from at least two different monomer units comprising:
  a first ethylene monomer unit comprising at least one basic nitrogenous group preferably chosen from among —NH$_2$, —NH—, —NHR, —NR$_2$, —CONH$_2$, —CONHR, R representing a C1–C6 alkyl radical, and from heterocyclic groups of pyridine type,
  a second unsaturated ethylene monomer unit comprising an aromatic group, preferably a phenyl, the weight content of said first monomer units relative to said second monomer units being between 40 and 60%, preferably around 50%.
2/25 to 90 weight %, preferably 40 to 80 weight %, further preferably 50 to 70 weight % of said hydrophobic sequences containing an organo-soluble polymer, and
3/5 to 70 weight %, preferably 15 to 30 weight %, further preferably 10 to 20 weight % of the hydrophilic sequences containing a water-soluble polymer.

With the anchoring sequences such as defined above, it is possible to obtain liquid concentrates of mineral fillers with high dry extracts which remain stable and compatible with the other constituents of paints, both in a solvent medium and in an aqueous medium, this being so for the different fillers of mineral type used in paints.

The reasons for which these anchoring sequences, and more generally the copolymers such as defined in the present invention, are particularly suitable in the desired application of the present invention, have not been fully explained by the inventors. It would seem that the two types of monomers of the anchoring sequence make it possible to set up both hydrogen bonds between the nitrogenous groups and hydroxyl groups of the fillers in a solvent medium, or with carboxyl groups for fillers in an aqueous medium, and polar bonds between the aromatic groups and said hydroxyl and carboxyl groups.

The inventors also put forward the hypothesis, that in a solvent medium the basic nitrogenous groups tend to exert a repelling effect vis-à-vis the solvent, which propels the aromatic groups towards the mineral filler and accentuates the polar bonds. And, conversely, the aromatic groups exert a repelling effect on the aqueous media, propelling the nitrogenous groups towards the mineral fillers and accentuating the hydrogen bonds with their hydroxyl and carboxyl environment.

The synthesis of these grafted copolymers is based on the use of the "macromonomer" technique and/or grafting of telomers functionalised on a linear chain or preformed graft recipient. They may therefore be prepared by radical copolymerisation of one or more hydrophilic macronomers and one or more hydrophobic macronomers with one or more nitrogenous co-monomers.

These syntheses are conducted in an inert atmosphere in the presence of a solvent or an appropriate mixture of solvents, i.e. in which the reagents, macromonomers, comonomers are fully soluble and the end products are fully or at least partially soluble. These solvents are normally chosen from among aromatic hydrocarbons such as toluene or xylene; ethers such as dioxane or terahydrofuran; ketones such as acetone or methylethylketone; esters such as ethyl acetate or butyl acetate. Preferably dioxane or tetrahydrofuran are used for the preparation of grafted copolymers.

Synthesis starts by preparing the macromonomers, by telomerisation then end fixation of a double bond, this step followed by copolymerisation of said macromonomers with the co-monomers.

It is also possible to prepare grafted copolymers according to the invention by fixing one or more functionalised molecules, one of the two types of hydrophilic or hydrophobic grafts, even both graft types, on a preformed polymer using reagent monomers, this chain possibly already containing one or more hydrophilic or hydrophobic grafts incorporated by radical route. In this case the reaction process requires the use of at least two different reactors, the first being used to prepare the main chain, the second to prepare the telomer.

The grafting of these side chains onto the preformed polymer may then be made by adding the content of the reactor or reactors containing the telomers to the first reactor.

The grafted copolymers of the invention, distributed along their anchoring sequence, have monomer units comprising basic nitrogenous groups, arranged statistic fashion.

Said basic groups may be defined by their pKa, lying between 2 and 14; preferably between 5 and 14, in particular between 5 and 12. Measurements of pKA are conducted at 25° C. in water at 0.01 molar concentration.

The invention therefore concerns a liquid concentrate of colourless mineral fillers containing a grafted copolymer such as defined above in which the anchoring sequence or sequences more particularly comprise:

1—said first monomers with basic nitrogenous groups formed from one or more compounds chosen from among vinylpyridines and preferably aminoalkyl-(meth)acrylate having the following formula 1:

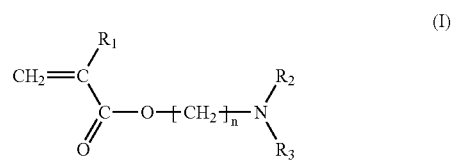

(I)

in which $R_1$ is a hydrogen atom or a (C1–C4) alkyl radical; $R_2$ and $R_3$ identical or different each represent a hydrogen or a (C1–C4) alkyl radical, n=0 to 6, and 2. said second monomer of the anchoring sequence consists of a monomer having following formula II:

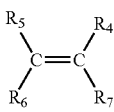

(II)

in which:
$R_4$, $R_5$, $R_6$ are identical or different and each represent a hydrogen or a (C1–C4) alkyl radical, preferably a hydrogen,
$R_7$ represents an aromatic group, in particular an optionally substituted phenyl group, in particular by a C1–C4 alkyl radical.

Said first monomer may in particular be an aminoalkyl methacrylate or a vinyl pyridine.

Said second monomer may in particular be a styrene or an alkylstyrene such as α and methylstyrene or tertiobutylstyrene.

More particularly, in said anchoring sequence, said first monomer is the monomer of 2-dimethylaminoethyl methacrylate (MADAME) and said second monomer is styrene.

The sequence or sequences of a hydrophobic nature are chosen so that their solubility properties are complementary with those of the sequence or sequences of hydrophilic nature mentioned below, so as to impart to the bi-grafted copolymer its universal dispersant nature vis-à-vis solvents and binders.

Advantageously, said hydrophobic sequence is formed by a hydrocarbon chain comprising —$COOR_{10}$ groups, in which $R_{10}$ is a C1–C10 alkyl radical, preferably a C4–C8 alkyl radical.

Preferably, said hydrophobic sequence is obtained from a macromonomer of following formula (III):

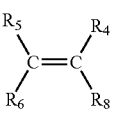

(III)

in which:
$R_4$, $R_5$, $R_6$ are identical or different and each represent a hydrogen or a C1–C4 alkyl radical, preferably a hydrogen
$R_8$ consists of a polymer whose monomer units comprise —$COOR_{10}$ groups, in which $R_{10}$ is a C1–C10 alkyl radical, preferably C4–C8.

The organosoluble polymers formed of monomer units whose solubility parameter is no more than 21.5 $J^{1/2}/cm^{3/2}$, preferably less than 19 $J^{1/2}/cm^{3/2}$, make up these sequences of a hydrophobic nature and enable dispersion of the particles in an apolar medium.

The incorporation of this or these sequences or grafts in the copolymer may be conducted by radical copolymerisation of one or more organosoluble macromonomers with one or more unsaturated ethylene comonomers mentioned above in the description of the anchoring sequence, namely one or more nitrogenous ethylene monomers, optionally one or more neutral unsaturated ethylene monomers and at least one macromonomer of hydrophilic nature described below (using routinely used primers, for example organic peroxides, redox systems, or preferably azoic compounds) and will lead to the formation of a bi-grafted copolymer.

These grafts of a hydrophobic nature may also be fixed by radical copolymerisation or by grafting on a linear or branched copolymer formed of one or more nitrogenous or unsaturated ethylene monomers cited above in the description of the anchoring sequence, and/or one or more macromonomers of a hydrophilic nature described below.

Preferably, the hydrophobicity of said hydrophobic sequences according to the invention is such that the solubility parameter of the monomers of the hydrophobic sequence is less than 22.5 $J^{1/2}/cm^{3/2}$.

The solubility parameters expressed in $J^{1/2}/cm^{3/2}$ were calculated using Hoftyzer-Van Krevelen's incrementation method or measured experimentally (for polydimethylsiloxane). The molar volumes needed for the calculation of solubility parameters are calculated using Feedor data. These calculation methods and experimental values are described in the work: D. W. VAN KREVELEN, "*Properties of polymers. Their correlation with chemical structure; their numerical estimation and prediction from additive group contributions*". Third edition, Elsevier, 1990, p. 189–225.

More particularly, according to the invention, the monomer units forming the macromonomers used to prepare the sequence or sequences of hydrophobic nature are preferably compounds having following formula IV:

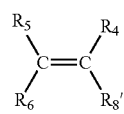

(IV)

in which:
$R_4$, $R_5$, $R_6$ are identical or different and each represent a hydrogen or a C1–C4 alkyl radical, preferably a hydrogen,
$R'_8$ represents $COOR_{10}$, in which $R_{10}$ is a C1–C10 alkyl, preferably substituted by a C4–C8 alkyl radical.

More particularly, in said formula IV above, $R'_8$ is an ethylhexyl methacrylate (EHMA).

The sequence or sequences of a hydrophilic nature, distributed statistic fashion along the main chain of the copolymer, account for the copolymer's solubility in water. It is these sequences which stabilise the dispersions of particles in an aqueous medium. The solubility parameter of the monomer units forming these hydrophilic grafts is 22 $J^{1/2}/cm^{3/2}$ or higher, preferably higher than 22.5 $J^{1/2}/cm^{3/2}$.

Advantageously, said hydrophilic sequence consists of a hydrocarbon chain comprising groups chosen from among —O—, —OH and —COOH.

The addition of these side chains to the copolymer may be made by using one or more macromonomers of hydrophilic nature. A macromonomer of this type is made up of a water-soluble polymer terminated at one of its ends by a group that can be radically polymerised.

Preferably, said hydrophilic sequence is obtained from a macromonomer having following formula (V):

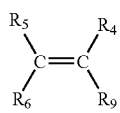

(V)

$R_4$, $R_5$ and $R_6$ are identical or different and each represent a hydrogen or a C1–C4 alkyl radical, preferably a hydrogen.

$R_9$ is a sequence of hydrophilic nature formed of a polymer whose monomer units comprise groups chosen from among —O—, —OH, —COOH.

The copolymerisation of one or more of these hydrophilic macromonomers with one or more unsaturated ethylene comonomers mentioned above in the description of the anchoring sequence, namely one or more a) compounds, one or more neutral unsaturated ethylene monomers, and at least one macromonomer of a hydrophobic nature described above (from primers routinely used, for example organic peroxides, redox systems or preferably azoic compounds) will lead to the formation of bi-grated copolymer according to the invention.

These grafts of a hydrophilic nature may also be fixed by radical copolymerisation or grafting on a linear or branched copolymer formed of one or unsaturated or nitrogenous ethylene monomers cited above in the description of the anchoring sequence.

As mentioned previously, in a grafted copolymer of the invention, the hydrophilic sequence is of a different chemical nature to said hydrophobic sequence, and to said anchoring sequence, and secondly the hydrophilicity of the hydrophilic sequence is greater than that of said hydrophobic and anchoring sequences.

Preferably, the hydrophilicity of said hydrophilic sequences is such that the solubility parameter of the monomers of the hydrophilic sequence is greater than 22.5 $J^{1/2}/cm^{3/2}$, preferably greater than 24 $J^{1/2}/cm^{3/2}$.

According to the invention, the monomer units forming the macromonomers, used to prepare the sequence or sequences of a hydrophilic nature are preferably chosen from among:

ethylene oxide, (meth)acrylic acids, maleic acid, fumaric acid, itaconic acid.

Further preferably, in above formula (V), $R_9$ is polyethylene glycol.

More particularly, the grafted copolymers of the invention are prepared by radical route ("macromonomer" technique) from macromonomers such as: (meth)acrylates of polyethyleneglycol, preferably having a molecular weight of 500 or more, such as HEMA-10, marketed by Bimax Chemicals Ltd.

Advantageously, the molecular weight of the grafted copolymer lies between 5000 and 25000, preferably between 10000 and 20000.

Said copolymers may be prepared by radical copolymerisation using macromonomers and/or by grafting polymers functionalised on a preformed chain, which therefore have a well controlled structure.

This synthesis method also offers the possibility of adjusting the molecular weight of the anchoring sequence, in order to increase the adsorption rate of the copolymers on the particles, both mineral and organic, and that of the side chains by improving their compatibility with the continuous phase.

Therefore, by using the grafted copolymers of the invention to prepare pigment concentrates, a dispersion state is achieved which is greater than the one obtained with dispersants of the prior art. Also, the high molecular weight of the products of the invention allows the preparation of pigment concentrates without any elongation resin.

Radical copolymerisation is preferably conducted at a temperature of between 50° C. and 140° C., and the grafting reaction at a temperature preferably between 20° C. and 150° C.

Advantageously, the order of addition of the monomers during radical copolymerisation is the following:

the macromonomers with high molecular weight, therefore less reactive, are added at the outset to the reactor, with the solvent, the comonomer or comonomers forming the main chain, which are more reactive, are added continuously over time so that their concentration always remains low relative to the concentration of macromonomers.

According to a first variant, a method for preparing a grafted copolymer such as defined above comprising at least three sequences of different chemical nature, among which an anchoring sequence on solid particles, one or more sequences of hydrophobic nature and one or more sequences of hydrophilic nature, in which the main chain is an anchoring sequence on the solid particles, characterized in that the radical copolymerisation is conducted:

i) of said first monomer(s) containing at least one basic nitrogenous group, in particular monomers having formula I above, and of said second monomers containing an aromatic group, in particular monomers having formula II above.

ii) of the hydrophobic macromonomers represented by formula III:

in which $R_4$, $R_5$, $R_6$ and $R_8$ have the meanings given above.

iii) of said hydrophilic macromonomers represented by formula V:

in which $R_4$, $R_5$, $R_6$ and $R_9$ are such as defined above.

The invention also concerns said copolymer in the form of one of its salts, obtained by quaternisation or neutralisation of base functions.

The subject of the present invention is a liquid concentrate of mineral fillers containing a solvent which may be either an aqueous or an organic solvent of the mineral fillers, which are colourless and can be used for paint manufacture, preferably carbonates, silicates, silicas and/or sulfates, and additives, characterized in that it comprises a grafted copolymer such as defined above.

It is recalled here that by "liquid" is meant a fluid whose rheological characteristics measured at 20° C. are as follows:

flow threshold, less than 15 $N/m^2$, and viscosity at 500 $s^{-1}$, less than 40 Pa·s The liquid concentrate of mineral filler according to the invention, contains a dry extract of mineral filler preferably of 70% or higher.

Further preferably, the liquid concentrate of the present invention comprises a dry extract of said grafted copolymer whose weight content represents 10 to 15% of the weight of said liquid concentrate.

The formulation of filler modules according to the invention is able to reduce:
the production time of paints down to a few minutes
the costs of raw material storage (in number and quantity); and:
manufacturing and formulation costs for paints, also increasing paint diversity and creativity (new paints) together with flexibility in production and finally automation of paint production.

A further subject of the present invention is a method for preparing paints using a liquid concentrate of mineral filler according to the invention, which is mixed with the other paint constituents, such as dyes, binders in organic or aqueous medium, and other additives in particular drying agents or bactericidal agents, antifoam agents as explained in example 3.

Other characteristics and advantages of the present invention will become apparent in the light of the detailed examples of embodiment given below.

EXAMPLE 1

Copolymer Preparation 1.1—Protocol

The different components are added to a tank, in semi-batch, so as to contain composition reaction having regard to the different reactivity of the various reagents. Copolymerisation is conducted at 80° C.

The conditions are described below:

| Composition at foot of tank: | |
|---|---|
| EHMA macromer: | 200 g |
| HEMA 10 macromer: | 44 g |
| STYRENE: | 40 g |
| MADAME: | 40 g |
| AIBN: | 4 g |
| THF: | 900 g |
| Tank total: | 1228 g |

When addition at the foot of the tank is completed, the reactor is left at 80° C. for approximately 10 hours to obtain total conversion.

The solution obtained, once cooled, is of light-coloured appearance with no gel formation.

The phase change of the copolymer is made by adding it to the aqueous phase and exchange occurs through azeotropic distillation.

The final suspension of the copolymer in aqueous phase is translucent after cooling.

2.2—Copolymer Examples

The characteristics of some of the prepared copolymers are grouped together in table 1.

Copolymers n° 7, 8, 10, 12, 14, 17 and 20 comprise anchoring sequences according to the invention. Copolymers n° 7, 8, 10, 12 and 20 comprise a preferred anchoring sequence.

Among these, copolymers n° 10, 12 and 17 contain a preferred hydrophobic sequence of the invention (EHMA) and copolymers n° 7, 10, 14, 17 and 20 contain a preferred hydrophilic sequence of the invention (HEMA-10).

TABLE 1

| Copolymers | Composition | 1 | 2 | 3 | 4 | 5 | 6 | 7 | 8 | 9 |
|---|---|---|---|---|---|---|---|---|---|---|
| Anchoring sequence | Methacrylic acid | 17 | | | 17 | | | | | 17 |
| | Styrene | | 17 | | | 17 | | 17 | 17 | |
| | MADAME (1) | | | 17 | | | | 17 | 17 | 17 |
| | 2-vinylpyridine | | | | | | 17 | | | |
| Hydrophobic sequence | Macromer PLMA (2) | 100 | 100 | 100 | | | | | | |
| | Macromer EHMA (3) | | | | 100 | 100 | 100 | | | |
| | Macromer P(LMA-s-EHMA) (4) | | | | | | | 100 | 100 | 100 |
| Hydrophilic sequence | Macromer HEMA-5 | | | | | | | | 22 | |
| | Macromer HEMA-10 | 22 | 22 | 22 | 22 | 22 | 22 | 22 | | 22 |
| Copolymer characteristics | Molecular weight | 15500 | 14200 | 13100 | 15700 | 17200 | 18500 | 12400 | 15000 | 14200 |
| | Polydispersity index | 1.59 | 1.79 | 1.53 | 1.94 | 1.54 | 1.82 | 1.41 | 1.73 | 1.68 |

| Copolymers | 10 | 11 | 12 | 13 | 14 | 15 | 16 | 17 | 18 | 19 | 20 |
|---|---|---|---|---|---|---|---|---|---|---|---|
| Anchoring sequence | 20 | | 20 | | | | 20 | | | 20 | |
| | 20 | | | | 17 | | | 17 | | | 20 |
| | | 20 | 20 | | | | | | 20 | 20 | |
| Hydrophobic sequence | | | | 20 | 17 | 17 | 20 | 17 | 17 | | |
| | 100 | 100 | 100 | | | | 100 | 100 | 100 | 100 | |
| | | | | 100 | 100 | 100 | | | | | 100 |
| Hydrophilic sequence | | | 22 | | | | | | | | |
| | 22 | 22 | | 22 | 22 | 22 | 22 | 22 | 22 | 22 | 22 |
| Copolymer characteristics | 14500 | 16800 | 14500 | 16500 | 14500 | 13500 | 15400 | 16800 | 18000 | 15800 | 18500 |
| | 1.68 | 1.59 | 1.54 | 1.58 | 1.69 | 1.55 | 1.89 | 1.64 | 1.79 | 1.55 | 1.50 |

(1) MADAME: 2-dimethylaminoethyl methacrylate
(2) PLMA: Polylauryl methacrylate, molecular weight: 3000, polydispersity index: 1.40
(3) Molecular weight: 2000, Polydispersity index: 1.26
(4) Molecular weight: 2700, Polydispersity index: 1.80

EXAMPLE 2

Preparation of Liquid Concentrate of Mineral Fillers

These liquid concentrates of mineral fillers are called hereinafter "filler modules".

2.1—Operating Protocol

Two types of filler modules were prepared.

Liquid concentrates of filler materials, called filler modules of the following two types were prepared:

| Aqueous | Solvent |
|---|---|
| Water | Solvents: white spirit (alkanes) |
| Copolymer | Copolymer |
| Fillers | Fillers |
| Additives: antifoam, bactericidal, rheology agent | Additives: rheology agent |

The operating mode for the manufacture of filler modules is the following, which can be applied to different types of filler materials and comprises the following successive steps:

1—Placing water or solvent in a tank
2—Adding the quantity of copolymers
3—Placing the tank under agitation with variable speed regulation and a dispersion disk adapted to tank size
4. Gradual addition of fillers under agitation at moderate speed (500–800 rpm).

This first phase is defined as the coating phase which enables copolymer wetting of the filler surface; the filler is not yet in maximum dispersion state (complete separation of the particles forming filler agglomerates); a coating time of approximately 20 minutes to 40 minutes depending upon filler characteristics. Part of the additives are also added during this coating phase.

5. The "grinding" operation is conducted by increasing the dispersion speed to 1500 rpm with a high peripheral speed of around 15–20 m/second. This so-called grinding operation does not concern grinding the elementary particles of filler but dispersing these particles contained in the agglomerates (grinding of agglomerates). The grinding time may vary from 20 minutes to 60 minutes depending on filler nature and especially its particle size, its specific surface area. The second part of the additives may be added when grinding is completed.
6. Module characteristics are controlled with the following measurements:
   dry extract
   rheological characteristics
   stability, compatibility 2.2 Types of Fillers Used The characteristics of the mineral fillers used in the examples are explained table 2 below.

2.3 Module Examples

Table 3 below groups together examples of modules, with copolymers n° 1 to n° 20 of example 1.

1. Stability Test:
Scale Used in the Tables
3—good
2—satisfactory
1—poor

The stability test was conducted on the modules but also on paints made from the mixture of modules.

This test was performed on a module sample which is placed for 3 weeks in a hot oven at 50° C. 3 tins of 200 ml were prepared and controlled before being placed in the oven.

At the end of each week, a tin was taken out of the oven and left overnight for its temperature to stabilise (at room temperature). The following controls were then made to analyse whether or not it had good stability:

verification of the module in its tin: detection of any surfacing (syneresis) or sedimentation (presence of a deposit at the bottom of the tin: hard, soft, large-size deposit or not.

measurement of viscosity and comparison relative to the control before oven heating: analysis to check whether the product has fluidified, thickened or hardened.

These observations and measurements are made after 1, 2 and 3 weeks; in relation to the results of the different analyses, the module was classified according to the above scale.

2. Compatibility Test
Scale Used in the Tables
3—good
2—satisfactory
1—poor

The compatibility test is intended to verify the physico-chemical behaviour of the module mixed with other modules or constituents of a modular paint: resin (binder) solvent, water etc.

The module was mixed in predetermined proportions with several constituents to a ratio of 50/50:
   a binder in aqueous phase
   a binder in solvent phase After mixing with a disk agitator, at a speed of approximately 600 rpm, the mixture was analysed:

observation of product: presence of agglomerates, phase separation, sedimentation, etc.

measurement of viscosity application, with a 100 micron calibrated applicator, onto a medium frequently used for painting, contrast card, to check transparency of the deposited film when wet and when dry after drying.

verification of dry film characteristics: opacity, gloss.

In relation to the results of this analysis the compatibility of the module was classified according to the above scale.

From these results, it arises that it is possible to obtain a concentrate of filler dry extract greater than 65% while obtaining good or at least satisfactory compatibility and stability properties solely for the copolymers comprising two types of monomers in the anchoring sequence, according to the present invention, namely copolymers n° 7, 8, 10, 12, 14, 17 and 20.

The highest dry extracts were obtained with anchoring sequences made up of MADAME and styrene (copolymers 7, 8, 10, 12 and 20).

Also, those copolymers having hydrophobic sequences with moderate hydrophobicity obtained with (EHMA) macromers, and hydrophilic sequences with high hydrophilicity obtained with HEMA-10 macromers (copolymers 7, 8, 10 and 17) show the best stability and compatibility.

TABLE 2

Types of fillers used

| FILLER FAMILIES | CHEMICAL NATURE | TYPES | NAMES | DENSITY | SPECIFIC SURFACE AREA in $m^2/g$ | PARTICLE SIZE Median diameter in microns | FILLER N° |
|---|---|---|---|---|---|---|---|
| CARBONATES | $CaCO_3$ | NATURAL | CHALK | 2.7 | 1 to 10 | 0.5 to 10 | 1 |
| | | | CALCITE | 2.7 | 1 to 10 | 0.5 to 50 | 2 |
| | | | MARBLE | 2.7 | 1 to 10 | 0.5 to 50 | 3 |
| | and $CaMgCO_3$ | NATURAL | DOLOMITE | 2.85 | 1 to 5 | 1 to 50 | 4 |
| | | PRECIPITATES | SOCAL ® | 2.75 | 1 to 40 | 0.2 to 2 | 5 |
| SILICATES | $SiO_3Mg(x)AL(y)OH(z)$ | NATURAL | TALC | 2.78 | 3 to 15 | 1 to 10 | 6 |
| | | | CHLORITE | 2.78 | 3 to 15 | 1 to 10 | 7 |
| | | | MICA | | 1 to 5 | 1 to 50 | 8 |
| | | | KAOLIN | 2.6 | 1 to 20 | 0.5 to 30 | 9 |
| | | | CLAY | 2.5 | 1 to 50 | 0.5 to 30 | 10 |
| | | CALCINED | KAOLIN | 2.1 | 5 to 100 | 0.5 to 20 | 11 |
| SULFATES | $BaSO_4$ | NATURAL | BARYTE | 4.4 | 0.5 to 2 | 2 to 40 | 12 |
| | | PRECIPITATES | BLANC FIXE | 4.4 | 1 to 3 | 0.7 | 13 |
| SILICAS | $SiO_2$ | NATURAL | SANDS | 2.6 | 0.5 to 2 | 1 to 50 | 14 |
| | | PRECIPITATES | SILICAS | 2.1 | 250 to 300 | 0.010 to 0.040 | 15 |
| | | FUMED | SILICAS | 2.2 | 50 to 400 | 0.007 to 0.010 | 16 |
| | | DIATOMACEOUS | SILICAS | 2.3 | 1 to 20 | 3 to 30 | 17 |

TABLE 3

| Weight % | Modules | | | | | | | | | | | | |
|---|---|---|---|---|---|---|---|---|---|---|---|---|---|
| | A | B | C | D | E | F | G | H | I | J | K | L | M |
| Water | 17 | 17 | 17 | 17 | 24 | 23 | 36 | 17 | 17 | | | | |
| White spirit - 1% aromatics | | | | | | | | | | 18 | 18 | 24 | 37 |
| Copolymers | | | | | | | | | | | | | |
| N° | 10 | 11 | 12 | 10 | 10 | 10 | (1) | 7 | 8 | 10 | 8 | 10 | (1) |
| dry % | 12 | 12 | 12 | 12 | 12 | 6 | — | 12 | 12 | 12 | 12 | 6 | — |
| Fillers | | | | | | | | | | | | | |
| N° | 2 | 2 | 2 | 4 | 2 + 5 | 2 | 2 | 2 | 2 | 2 | 2 | 2 | 2 |
| dry % | 70 | 65 | 70 | 70 | 63 | 70 | 63 | 70 | 70 | 70 | 70 | 70 | 63 |
| Antifoam + bactericide | | | | | | | | | | | | | |
| % | 1 | 1 | 1 | 1 | 1 | 1 | 1 | 1 | 1 | — | — | — | — |
| Rheological characteristics at 20° C.: | | | | | | | | | | | | | |
| flow threshold $N/m2$ | 7 | 6 | 7 | 10 | 9 | 12 | >15 | 9 | 8 | 4 | 4 | 9 | >15 |
| viscosity at 500 s-1 Pa · s | 10 | 11 | 12 | 15 | 17 | 35 | >40 | 20 | 18 | 9 | 9 | 27 | >40 |
| Stability: | | | | | | | | | | | | | |
| 3 - Good 2 - Satisfactory 1 - Poor | 3 | 1 | 3 | 3 | 3 | 1 | 1 | 3 | 3 | 3 | 3 | 1 | 1 |
| Compatibility: | | | | | | | | | | | | | |
| 3 - Good 2 - Satisfactory 1 - Poor | 3 | 2 | 1 | 3 | 3 | 1 | 1 | 2 | 2 | 3 | 2 | 1 | 1 |
| Fillers: | | | | | | | | | | | | | |
| Volume $Es^1$ | 48.0 | 48.0 | 48.0 | 48.0 | 43.0 | 48.0 | 43.0 | 48.0 | 48.0 | 48.0 | 48.0 | 43.0 | 43.0 |

| Weight % | Modules | | | | | | | | | | | | | |
|---|---|---|---|---|---|---|---|---|---|---|---|---|---|---|
| | N | O | P | Q | R | S | T | U | V | W | X | Y | Z | AA | AB |
| Water | 17 | 27 | 27 | 27 | 27 | 23 | 24 | 27 | 22 | 27 | 27 | 22 | 27 | 24 | 17 |
| White spirit - 1% aromatics | | | | | | | | | | | | | | | |
| Copolymers | | | | | | | | | | | | | | | |
| N° | 10 | 1 | 2 | 3 | 4 | 5 | 6 | 13 | 14 | 15 | 16 | 17 | 18 | 19 | 20 |
| dry % | 12 | 12 | 12 | 12 | 12 | 12 | 12 | 12 | 12 | 12 | 12 | 12 | 12 | 12 | 12 |

TABLE 3-continued

| Fillers | | | | | | | | | | | | | | | |
|---|---|---|---|---|---|---|---|---|---|---|---|---|---|---|---|
| N° | 12 | 2 | 2 | 2 | 2 | 2 | 2 | 2 | 2 | 2 | 2 | 2 | 2 | 2 | |
| dry % | 70 | 60 | 60 | 60 | 60 | 55 | 55 | 60 | 65 | 60 | 60 | 65 | 60 | 63 | 70 |
| Antifoam + bactericide | | | | | | | | | | | | | | | |
| % | 1 | 1 | 1 | 1 | 1 | 1 | 1 | 1 | 1 | 1 | 1 | 1 | 1 | 1 | 1 |
| Rheological characteristics at 20° C.: | | | | | | | | | | | | | | | |
| flow threshold N/m2 | 3 | 20 | 18 | 8 | 25 | 20 | 25 | 12 | 15 | 18 | 9 | 8 | 11 | 10 | 6 |
| viscosity at 500 s-1 Pa · s | 5 | 10 | 11 | 12 | 15 | 17 | 35 | 35 | 40 | 11 | 10 | 9 | 12 | 12 | 9 |
| Stability: | | | | | | | | | | | | | | | |
| 3 - Good | | | | | | | | | | | | | | | |
| 2 - Satisfactory | 3 | 1 | 1 | 2 | 1 | 1 | 1 | 1 | 2 | 1 | 3 | 3 | 2 | 2 | 3 |
| 1 - Poor | | | | | | | | | | | | | | | |
| Compatibility: | | | | | | | | | | | | | | | |
| 3 - Good | | | | | | | | | | | | | | | |
| 2 - Satisfactory | 3 | 1 | 1 | 1 | 1 | 1 | 1 | 1 | 1 | 1 | 2 | 2 | 2 | 3 | 1 |
| 1 - Poor | | | | | | | | | | | | | | | |
| Fillers: | | | | | | | | | | | | | | | |
| Volume Es[1] | 42.0 | 40.0 | 40.0 | 40.0 | 40.0 | 40.0 | 38.0 | 40 | 44 | 40 | 40 | 44 | 40 | 43 | 48 |

(1) commercially available short chain polymer dispersant
[1]Es: dry extract?

EXAMPLE 3

Preparation of Modular Paints 3.1 Operating Protocol

Two types of paints with filler modules were prepared:

| Aqueous paint | Solvent paint |
|---|---|
| Water | Aliphatic solvents, |
| Aqueous binder: vinyl | aromatics, isoparaffinics |
| and/or acrylic latex | Solvent binders: alkydes, |
| Aqueous filler modules | glycerophtalics |
| Additives: bactericides, | Solvent or universal filler |
| antifoam, rheology agent | modules |
| Dyes | Additives: rheology agent, |
| | drying agent, plasticizer |
| | Dyes |

The modular constituents are all liquid and can therefore be stored in tanks, can be pumped, proportioned automatically and are easily miscible.

Paint production can therefore be quick and economical.

The operating mode for manufacturing modular paints which can be applied to all weight or volume combinations between the different liquid constituents, comprises the following successive steps:

1—Placing the different constituents in a tank,

2—Placing the tank under agitation with variable speed agitator comprising a mixer blade suitable for liquid mixtures in relation to the size of the tank, for a mixing time of approximately 20 minutes at a speed of 700 rpm. The mixture can also be made using a vibration type agitator on tins of 1 to 20 litres in which the various liquid constituents have been proportioned. Mixing is performed after closing the lid and shaking the tin with the agitator for approximately 5 minutes.

3—Controls of paint characteristics are carried out by measuring the following parameters:

For liquid paint:
  Density (g/cm3)
  Dry extract
  Viscosity
  stability
For the dry film:
  calorimetric coordinates
  opacity
  surface brilliance The formulae of the prepared paints are given in table 4. The best results were obtained with modules A and H containing copolymers n° 10 and 7.

TABLE 4

| | | AQUEOUS | | | | | SOLVENT | | | | |
|---|---|---|---|---|---|---|---|---|---|---|---|
| PAINTS | | 1 | 2 | 3 | 4 | 5 | 1 | 2 | 3 | 4 | 5 |
| Water | % | 5 | 5 | 5 | 5 | 5 | — | — | — | — | — |
| White spirit - 1% aromatic | % | — | — | — | — | — | 10 | 10 | 10 | 10 | 10 |
| Aqueous binder (1) | % | 30 | 30 | 30 | 30 | 30 | — | — | — | — | — |
| Solvent binder (2) | % | — | — | — | — | — | 25 | 25 | 25 | 25 | 25 |
| Filler module | N° | A | B | C | H | G | A | B | C | H | G |
| | % | 43 | 43 | 43 | 43 | 43 | 43 | 43 | 43 | 43 | 43 |
| Additives (3) | % | 2 | 2 | 2 | 2 | 2 | 2 | 2 | 2 | 2 | 2 |
| White dye | % | 20 | 20 | 20 | 20 | 20 | 20 | 20 | 20 | 20 | 20 |
| Characteristics (4) | | | | | | | | | | | |
| Liquid paint | | 3 | 2 | 2 | 3 | 1 | 3 | 1 | 3 | 2 | 1 |
| Dry film | | 3 | 2 | 2 | 3 | 1 | 3 | 1 | 3 | 2 | 1 |

(1) Aqueous dispersion of an acrylic-styrene thermoplastic copolymer with 50% dry extract
(2) Alkyde resin with 65% oil length and 60% dry extract dissolved in white spirit, aromatic solvent less than 1%
(3) Additives adjusted to control independent characteristics of filler modules: antifoam, bactericidal, rheology agents, drying agents.
(4) 3 = good
2 = satisfactory
1 = poor

The invention claimed is:

1. Liquid concentrate of colorless mineral fillers which can be used to manufacture paints, said concentrate containing an aqueous or organic solvent, mineral filler particles and a grafted copolymer containing at least three sequences of different chemical nature, comprising at least one anchoring sequence for anchoring onto the solid mineral filler particles, onto which at least one anchoring sequence are grafted at least one sequence of a hydrophobic nature and at least one sequence of a hydrophilic nature, said concentrate comprising a dry extract of said mineral fillers of 65% or more by weight of said liquid concentrate, and said copolymer comprising:
1) 5 to 40 weight % of said anchoring sequence consisting of a linear copolymer formed from at least two separate monomer units containing:
a) said first monomer units comprising basic nitrogenous groups formed from one or more compounds selected from the group consisting of vinylpyridine and aminoalkyl(meth)acrylate having following formula (1):

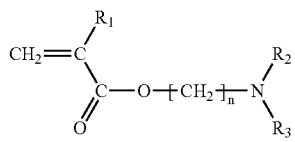

(I)

in which $R_1$ is a hydrogen atom or a (C1–C4) alkyl radical; $R_2$ and $R_3$ identical or different each represent a hydrogen or a (C1–C4) alkyl radical, n=0 to 6, and
b) said second monomer units of the anchoring sequence containing a monomer having following formula (II):

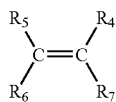

(II)

in which:
$-R_4$, $R_5$, $R_6$ are identical or different and each represent a hydrogen or a C1–C4 alkyl radical, and $R_7$ represents an aromatic group optionally comprising a phenyl group substituted with a C1–C4 alkyl radical,
the weight content of said first monomer units relative to said second monomer units being 40 to 60%.

2. Liquid concentrate according to claim 1, wherein in said anchoring sequence, said first monomer is the monomer of 2-dimethylaminoethyl methacrylate and said second monomer is styrene.

3. Liquid concentrate according to claim 1, wherein said hydrophobic sequence is formed of a hydrocarbon chain containing —$COOR_{10}$— groups in which $R_{10}$ is a C1–C10 alkyl and OH groups.

4. Liquid concentrate according to claim 3, wherein said hydrophobic sequence is obtained from a macromonomer having following formula III:

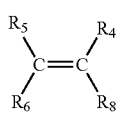

(III)

in which
$R_4$, $R_5$, $R_6$ are identical or different and each represent a hydrogen or a C1–C4 alkyl radical,
R8 is formed by a polymer whose monomer units contain —$COOR_{10}$ groups, in which $R_{10}$ is a C1–C10 alkyl.

5. Liquid concentrate according to claim 4, wherein in said hydrophobic sequence of formula III, $R_8$ is formed from monomer units having following formula IV:

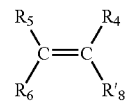

(IV)

in which:
$R_4$, $R_5$, $R_6$ are identical or different and each represent a hydrogen or a C1–C4 alkyl radical, preferably a hydrogen
$R'_8$ represents $COOR_{10}$ where R is a C1–C10 alkyl radical.

6. Liquid concentrate according to claim 5, wherein in said formula IV, $R'_8$ is an ethylhexyl methacrylate.

7. Liquid concentrate according to claim 1, wherein said hydrophilic sequence is formed by a hydrocarbon chain containing groups selected from the group consisting of —O, —OH, and —COOH.

8. Liquid concentrate according to claim 7, wherein said hydrophilic sequence is obtained from a macromonomer having following formula V:

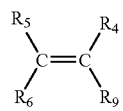

(V)

$R_4$, $R_5$, $R_6$ are identical or different and each represent a hydrogen or a C1–C4 alkyl radical,
$R_9$ is a sequence of hydrophilic nature formed of a polymer whose monomer units contain groups selected fro the group consisting of —O—, —OH, and —COOH.

9. Liquid concentrate according to claim 8, wherein in formula (V), $R_9$ is polyethylene glycol.

10. Liquid concentrate according to claim 1, wherein said colorless mineral fillers which can be used for manufacturing paints are selected from the group consisting of fillers of carbonate, silicate, silica and sulfate.

11. Liquid concentrate of mineral fillers according to claim 1, containing a dry extract of mineral fillers of 70% or more.

12. Liquid concentrate of mineral fillers according to claim 1, wherein the dry extract weight content of said grafted copolymers is 10 to 15% by weight of said liquid concentrate.

13. Method for preparing paints, comprising mixing a liquid concentrate of mineral fillers according to claim 1 with other paint constituents.

14. Liquid concentrate according to claim 1, wherein $R_4$, $R_5$, $R_6$ are hydrogen.

15. Liquid concentrate according to claim 4, wherein $R_4$, $R_5$, $R_6$ are hydrogen.

16. Liquid concentrate according to claim 5, wherein $R'_8$ represents $COOR_{10}$ where R is a C1–C10 alkyl radical substituted by a C4–C8 alkyl radical.

17. Liquid concentrate according to claim 8, wherein $R_4$, $R_5$, $R_6$ are hydrogen.

* * * * *

UNITED STATES PATENT AND TRADEMARK OFFICE
CERTIFICATE OF CORRECTION

PATENT NO. : 7,193,008 B2  Page 1 of 1
APPLICATION NO. : 10/472489
DATED : March 20, 2007
INVENTOR(S) : Pierre Legrand et al.

It is certified that error appears in the above-identified patent and that said Letters Patent is hereby corrected as shown below:

Title Page item 73

Change the name of the Assignee to read:

--LES PEINTURES JEFCO FRANCIS ET JEAN DUFOUR, Marseille, France--

Signed and Sealed this

Fifteenth Day of July, 2008

JON W. DUDAS
*Director of the United States Patent and Trademark Office*